July 31, 1945.  J. D. MORGAN ET AL  2,380,704
MOTOR FUEL KNOCK RATING
Filed March 28, 1941
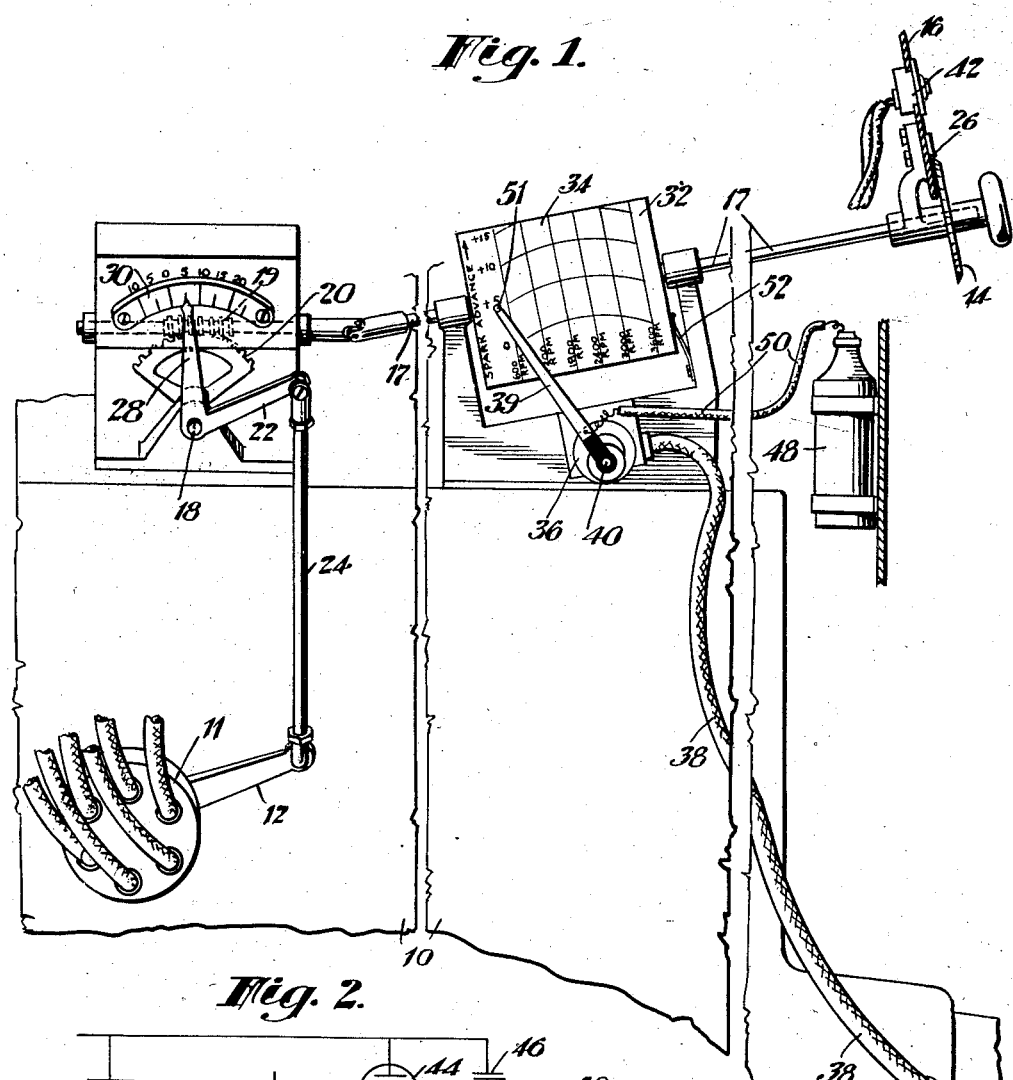
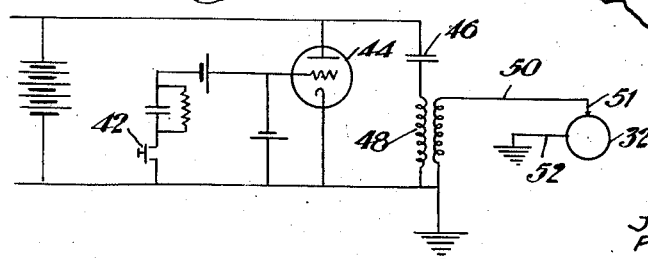
INVENTOR
JOHN D. MORGAN
PERCY B. LEVITT
BY
ATTORNEY Patented July 31, 1945

2,380,704

UNITED STATES PATENT OFFICE 2,380,704

MOTOR FUEL KNOCK RATING

John D. Morgan, South Orange, and Percy B. Levitt, Millburn, N. J., assignors to Cities Service Oil Company, New York, N. Y., a corporation of Pennsylvania Application March 28, 1941, Serial No. 385,657

9 Claims. (Cl. 73—35)

This invention relates to the testing of fuels for spark ignition internal combustion engines, and is particularly directed to an improved instrument adapted for use in making comparative knock-rating tests of spark ignition motor fuels.

Producers and distributors of gasoline and other fuels for automobile, aeroplane and other spark ignition engines have for many years been actively engaged in research directed to improving the combustion characteristics of such fuels. An important phase of such research has consisted of performance rating tests of such fuels in comparison with standard reference fuels by dynamometer and road tests. Among the properties of the fuels which the performance rating tests are designed to measure, one of the most important is the so-called knock rating or octane number. The octane number of the fuel has been defined as the percentage of iso-octane (the anti-knock agent) in an iso-octane-normal-heptane blend (base reference fuel), which gives a knock tendency equal to that of the fuel under test. In routine rating tests the standard reference fuels employed are usually straight-run naphthas having octane numbers which have been determined using a standard C. F. R. (Cooperative Fuel Research) engine.

Various methods and metering means for measuring knock intensity have been proposed, but the most commonly used and reliable is still the audible matching method whereby the trained engine operator notes comparative knock intensity or knock trace by ear. It has been impossible heretofore to make strictly comparable knock rating determinations using different engines because of differences in engine cylinder head design, in cylinder and jacket temperatures, in carbureter setting affecting air-fuel ratio, in spark advance characteristics of distributors, and in condition and amount of carbon and scale deposit on cylinder walls and valves. Another important factor which must be considered is that of atmospheric humidity and temperature; and it is obvious that fuel rating tests, both on the dynamometer and on the road, should be carried out under as nearly uniformly comparable conditions as is practical.

The test instrument which forms the subject of the present invention has been designed particularly to meet the demand for a means for recording knock rating tests which may provide a broader and more accurate basis of comparison between records taken with the same or different engines. A more particular object of the invention is to provide an instrument adapted for general use in making knock rating determinations of fuels in spark ignition engines and for recording conditions of engine speed and spark advance at which audible matching knock occurs at predetermined load.

With the above and other objects and features in view the invention consists in the improved method and apparatus for making motor fuel knock rating determinations as hereinafter described and more particularly defined in the accompanying claims.

In the following description of the knock rating instrument which forms the subject of the present invention, reference will be had to the accompanying drawing, in which:

Fig. 1 is a schematic assembly view showing a preferred design of fuel knock rating instrument mounted over the engine and under the hood of an automobile; and Fig. 2 is a wiring diagram of a manually actuated electrical recording instrument adapted for use in recording audible matching knock intensities.

While the knock rating recording instrument of the present invention has been shown as operatively connected with an automobile engine in convenient position for conducting road tests, it will be appreciated that the knock rating instrument is not limited in application to road testing of automobile engines; and that the invention is not limited to the electrically-operated recording unit portrayed.

Referring to the drawing, the standard distributor of a six-cylinder automobile engine 10 has been replaced by a fixed cam distributor 11 having a manually controlled spark advance lever 12. The distributor 11 may be the standard distributor for the car converted to a fixed cam distributor by disconnecting any mechanical or vacuum spark advance controls and locking the cam to the distributor shaft. For the convenience of the test operator, a calibrated dial 14 is mounted under the instrument panel 16 of a car in convenient position for use of the test operator in manually adjusting the spark advance. Dial 14 is keyed to a rotatable shaft 17 which in turn actuates a short crank shaft 18 through a worm 19 and a quadrant rack 20. A crank 22 is keyed to the shaft 18 and has its free end linked to the end of lever 12 by a connecting rod 24. For convenience in calibrating and setting the spark advance dial 14 in relation to a fixed pointer 26 on the instrument panel to register a given degree of spark advance with respect to the top dead center position of one of the cylinders of engine 10, crank 22 has been equipped with a pointer 28 which swings with the crank over dial 30 of the spark synchronizer.

The recording element of the present instrument includes a drum 32 which is shown as keyed to shaft 17 for rotation therewith. As illustrated, a lined recording chart 34 is mounted on the periphery of drum 32 and is calibrated to register engine speed and degrees of spark advance corresponding with those registered by the dial 14 and by the synchronizer 30.

One of the principal elements of the instrument is a tachometer 36 which is shown as mounted adjacent drum 32 and as having a flexible shaft 38 which is operatively connected with the engine crank shaft. It will be understood that the tachometer 36 may be operated as a fifth wheel tachometer when conducting road tests. A speed indicating pointer 39 is keyed to shaft 40 of the tachometer in position to swing in an arc longitudinally over the drum 32; and chart 34 is lined so that the position of the end of pointer 39 indicates on the chart the speed of the engine 10.

For the purpose of making permanent records on the chart 34 of the relative degree of spark advance and speed of the engine at which audible matching knock intensities or trace knocks are apparent to the operator, the instrument forming the subject of the present invention has been equipped with a recording unit including a switch 42 mounted on the instrument panel in convenient position for manual closing by the operator at the instant that trace knock, or knock of predetermined intensity, is observed. As shown in Fig. 2, switch 42 is mounted in the grid control circuit of a thyratron tube 44 the main electrodes of which are connected across the terminals of a main condenser 46. Closing of switch 42 changes the potential of the grid of thyratron 44, thereby triggering discharge of condenser 46 through the thyratron, and causing a surge of current flow through the primary winding of a coil 48. The surge of current flow through the primary of coil 48 sets up a momentary surge of high potential current through the secondary of the coil, and this high potential current is conducted by a wire 50 to a spark point 51 at the end of tachometer pointer 39 from which a high potential spark jumps through the non-flammable chart 34 to the surface of drum 32, which is in turn grounded to the frame by spring contact 52. The puncture thus made by the spark in the chart provides a permanent record of the particular engine speed and degree of spark advance at which the operator observed trace knock or knock of predetermined intensity under the load conditions of the test.

Before starting knock rating tests on a particular engine with a particular fuel, the zero spark advance line of chart 34 should be aligned in registering position with respect to recording point 51 of pointer 39 when the zero calibration on dial 14 is aligned with indicator 26. Turning dial 14 counter-clockwise to the 5° before top dead center position should then bring the end of pointer 39 over the corresponding 5° advance line on chart 34, as portrayed in Fig. 1. Synchronizer 30 and the links connecting the pointer 28 to the distributor spark advance cam are used in adjusting and calibrating the instrument for use with different distributors.

After calibration the instrument is used for making knock rating recordings both for dynamometer tests and for road tests while comparing a fuel under test with a standard reference fuel of known knock rating. In dynamometer tests the usual practice is to operate the engine under full throttle and with increasing load application, thereby gradually reducing the speed to a point at which trace knock is observed; and recorded trace knock points are plotted for different degrees of spark advance in order that the full record taken for a fuel under test may include data of relative fuel knock ratings in the range of maximum power developing operation for the engine employed in the test. For road tests both accelerating and decelerating test runs may be made over a predetermined test course, recording particular speeds and degrees of spark advance at which knocking begins or ceases under full throttle and half throttle fuel-air supply.

Having thus described the invention, what is claimed as new is:

1. An instrument adapted for making comparative knock rating records of spark ignition motor fuels which comprises, means for manually varying the spark advance of the motor, a recording chart drum mounted for actuation by said means, a tachometer having a pointer arranged to move over said drum in response to variations in motor speed, and manually controlled means for recording on the chart the relative positions of the tachometer pointer and drum at instants in motor operation when audibly matching trace knocks occur.

2. An instrument adapted for making comparative knock rating records of spark ignition motor fuels which comprises, means for manually adjusting the spark advance of the motor, a tachometer for measuring motor speed, and means including elements under the control of said advance adjusting means and tachometer for recording the particular motor speed and spark advance at any instant when audible matching trace knocks occur during motor operation.

3. A method of making knock rating tests of motor fuels which comprises successively operating a spark ignition engine with a base reference fuel and with a fuel to be tested on a dynamometer, operating the engine at full throttle, varying the load to produce incipient knock and recording the point of knock on a chart, and repeating the change in load and the recording of the point of incipient knock for a considerable number of different degrees of spark setting to obtain points of incipient knock for the different loads and speeds and plotting knock rating curves based on spark advance for comparison of the fuel being tested with a known base reference fuel in the same engine.

4. The method of making comparative knock rating tests of motor fuels which comprises operating a spark ignition engine over a fixed course on a road with a base reference fuel and a fuel to be tested, operating the engine at full throttle, varying the spark advance and recording the point where knock begins and ceases at different points along the road course for the fuels to obtain comparative knock ratings of the fuels in said engine in terms of the spark advance.

5. The method of making comparative knock rating tests of motor fuels which comprises operating a spark ignition engine over a fixed course on a road separately with a base reference fuel and with a fuel to be tested, operating the engine at full throttle, varying the spark advance and recording the point where knock begins and ceases at different points along the road course for the fuels, and repeating the same tests with the fuel supplies set at half throttle to obtain comparative knock ratings in terms of the spark advance of the fuel being tested with the knock rating of a base reference fuel.

6. The method of making comparative knock rating tests of motor fuels which comprises operating a spark ignition engine over a fixed course on a road separately with a base reference fuel and with a fuel to be tested, operating the engine with a fixed definite throttle setting and varying the spark advance to maintain the engine in a condition of incipient knock, and recording the speed of the engine on the course to obtain comparative knock ratings of the fuels in terms of the spark advance of the fuel being tested with the knock rating of a base reference fuel.

7. The method of making knock rating tests of motor fuels in which the method defined in claim 4 is carried out with the same fuels when operating a series of different engines to obtain the spark advance knock rating curves for all engines tested to give comparison of the knock rating of the fuel in a performance test in the various engines.

8. A method of making knock rating tests of motor fuels in which the method defined in claim 5 is carried out with the same fuels when operating a series of different engines to obtain spark advance knock rating curves for all engines tested to give comparison of the knock ratings of the fuels in a performance test in the various engines.

9. A method of making knock rating tests of motor fuels in which the method defined in claim 6 is carried out with the same fuels when operating a series of different engines to obtain spark knock rating curves for all engines tested to give comparison of the knock ratings of the fuel in a performance test in the various engines.

JOHN D. MORGAN.
PERCY B. LEVITT.